Patented Oct. 16, 1951

2,571,742

UNITED STATES PATENT OFFICE 2,571,742

3-CHLOROTHIANAPHTHENE

Rush F. McCleary, Beacon, and John A. Patterson, Newburgh, N. Y., assignors to The Texas Company, New York, N. Y., a corporation of Delaware No Drawing. Application May 12, 1948,
Serial No. 26,706

2 Claims. (Cl. 260—330.5)

This invention relates to the preparation of monochlorothianaphthene derivatives in which the thianaphthene is substituted with chlorine in the 3-position. This invention is particularly concerned with the preparation of 3-chlorothianaphthene.

3-chlorothianaphthene is a water-white liquid boiling at about 111 to 113° C. at 10 mm. pressure. 3-chlorothianaphthene is useful as an insecticide, a fungicide and an intermediate in the manufacture of drugs and dyes.

We have prepared 3-chlorothianaphthene as well as several derivatives thereof. The procedure employed for the preparation of 3-chlorothianaphthene involved a continuous direct chlorination of thianaphthene in a carbon tetrachloride solution. By restricting the contact time of chlorine with the thianaphthene and by regulating the mol ratio of thianaphthene to chlorine, it is possible to obtain predominantly a monochlorothianaphthene derivative consisting mainly of 3-chlorothianaphthene.

The following example illustrates this method of preparation of 3-chlorothianaphthene but is not to be construed as limiting the invention to this method of preparation alone:

A 20 weight per cent solution of thianaphthene in carbon tetrachloride and gaseous chlorine were continuously and simultaneously introduced into the bottom of a reactor consisting of a vertical glass tube of about 1″ in diameter and having a volume from the inlet to the outlet of approximately 530 cc. The feed rate of the carbon tetrachloride solution of thianaphthene was 1800 cc. per hour and chlorine was fed to the reactor at 160 grams per hour, so that the mol ratio of thianaphthene to chlorine was approximately 1.75; the space velocity measured in terms of weight of thianaphthene per hour per unit volume of reactor space was about 1.0. The liquid product was continuously withdrawn and contacted with solid sodium bicarbonate to remove acidic materials. Thereafter, carbon tetrachloride was distilled from the liquid product and the remaining chlorinated product was fractionally distilled to yield unreacted thianaphthene monochlorothianaphthene and dichlorothianaphthene. The yield of crude 3-chlorothianaphthene distilling between 110 and 125° C. at 10 mm. pressure was 46.3 mol per cent on the basis of the chlorine charged or 52 mol per cent based upon the thianaphthene consumed. The purified 3-chlorothianaphthene had a boiling point of 111 to 113° C. at 10 mm.

The purified 3-chlorothianaphthene has a refractive index of 1.6392 at 20° C. and a density of 1.315 at 20° C. Quantitative analysis of the product showed an observed sulfur value of 19.4 per cent as compared with the theoretical value of 19.0 and an observed chlorine value of 21.3 as contrasted with a theoretical value of 21.0. The structural formula of this novel compound is:

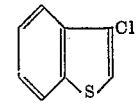

There was also obtained as a by-product 2,3-dichlorothianaphthene boiling point 134 to 138° C. at 10 mm. in a 20.6 mol per cent yield on the basis of the chlorine charged or 11.5 mol per cent yield on the basis of the thianaphthene consumed.

The picrate of 3-chlorothianaphthene was prepared by reacting 3-chlorothianaphthene with an alcoholic solution of picric acid. The solid material precipitated from the alcoholic solution after repeated crystallizations had a sharply defined melting point of 117.5 to 118° C. and quantitative analysis showed an observed sulfur value of 8.5 per cent as compared with a theoretical value of 8.1, an observed chlorine value of 8.9 per cent as compared with a theoretical value of 8.9 and an observed nitrogen value of 10.1 per cent as compared with a theoretical value of 10.5 for the picrate of 3-chlorothianaphthene having the following structural formula:

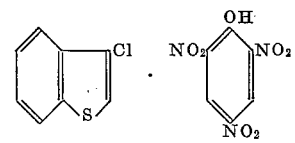

The sulfone of 3-chlorothianaphthene was prepared by reacting a mixture of 100 cc. each of hydrogen peroxide, acetic acid and acetic anhydride with 16.0 grams of 3-chlorothianaphthene at reflux for one hour. There was obtained a solid material which, after recrystallization, had a melting point of 166 to 168° C. and which is the sulfone of 3-chlorothianaphthene of the following structural formula:

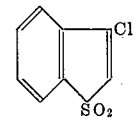

Quantitative analysis of the product showed an observed sulfur value of 16.5 per cent as compared with the theoretical value of 15.9 and an observed chlorine value of 17.8 per cent as compared with a theoretical value of 17.7 per cent.

We claim:

1. A continuous process for preparing 3-chlorothianaphthene which comprises introducing liquid thianaphthene and chlorine at a mol ratio of thianaphthene to chlorine of about 1.75 into contact with one another in a reaction zone at a space velocity of about 1.0 weights of thianaphthene per hour per unit volume of reactor space, and continuously withdrawing the resulting liquid 3-chlorothianaphthene from the reaction zone.

2. A process according to claim 1 in which the thianaphthene is dissolved in carbon tetrachloride.

RUSH F. McCLEARY.
JOHN A. PATTERSON.

REFERENCES CITED

The following references are of record in the file of this patent:

Komppa: J. Prakt. Chem. (2) 122, pp. 322, 326–329 (1929).

Beilstein's Handbuch der Organischen Chemie, XVIII, p. 59 (1933).

Steinkopf, Die Chemie des Thiophens, pp. 158, 160, 161 (1941), Edwards reprint.

Chemical Abstracts, 40:5720 (1946).